United States Patent
Jang (10) Patent No.: US 11,364,761 B2
(45) Date of Patent: Jun. 21, 2022

(54) VEHICLE SUSPENSION DEVICE

(71) Applicants: Hyundai Motor Company, Seoul (KR); Kia Motors Corporation, Seoul (KR)

(72) Inventor: Dae Won Jang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 204 days.

(21) Appl. No.: 16/849,573

(22) Filed: Apr. 15, 2020

(65) Prior Publication Data
US 2021/0170825 A1    Jun. 10, 2021

(30) Foreign Application Priority Data
Dec. 4, 2019  (KR) .......................... 10-2019-0159912

(51) Int. Cl.
*B60G 13/00*  (2006.01)
*B62D 5/04*  (2006.01)
(Continued)

(52) U.S. Cl.
CPC ......... *B60G 17/015* (2013.01); *B60G 13/003* (2013.01); *B60G 15/02* (2013.01);
(Continued)

(58) Field of Classification Search
CPC . B60G 11/16; B60G 3/18; B60G 3/00; B60G 2800/162; B60G 2500/00;
(Continued)

(56) References Cited

U.S. PATENT DOCUMENTS 2,559,935 A * 7/1951 Brown ............... B62D 49/0678
                                                      280/124.113
3,966,220 A * 6/1976 Forsyth .................... B60P 3/07
                                                      280/638
(Continued)

FOREIGN PATENT DOCUMENTS

CN   203094172 U  *  7/2013 ........... B62D 5/0418
DE    10045956 A1 *  3/2002 ........... B62D 5/0418
(Continued)

OTHER PUBLICATIONS

Machine translation of DE 10045956 A1 from espacenet.com January 2022.*

*Primary Examiner* — Paul N Dickson
*Assistant Examiner* — Maxwell L Meshaka
(74) *Attorney, Agent, or Firm* — Slater Matsil, LLP (57) ABSTRACT

A vehicle suspension device includes a wheel body on which a wheel and tire unit is mounted, a steering drive unit configured to transmit a driving force to rotate the wheel body in a lateral direction of a vehicle body, so that the wheel and tire unit rotates together with the wheel body, and a wheel moving unit disposed on the vehicle body to be movable in a front-back direction, configured such that a position thereof changes in a top-bottom direction, and connected to the wheel body to support the wheel body, so that a position of the wheel body is changed in response to the wheel moving unit moving in the front-back direction and changing the position in the top-bottom direction.

20 Claims, 8 Drawing Sheets

(51) Int. Cl.
*B60G 17/015* (2006.01)
*B60G 15/02* (2006.01)

(52) U.S. Cl.
CPC ........ *B62D 5/0418* (2013.01); *B60G 2202/20* (2013.01); *B60G 2500/00* (2013.01); *B60G 2800/162* (2013.01)

(58) Field of Classification Search
CPC ............ B60G 2202/21; B60G 2202/20; B60G 15/02; B60G 13/005; B62D 7/1509; B62D 5/04; B62D 5/0418
See application file for complete search history.

(56) References Cited

U.S. PATENT DOCUMENTS

| | | | |
|---|---|---|---|
| 2008/0190682 A1* | 8/2008 | Mahy | B60B 35/1072 180/209 |
| 2018/0170139 A1 | 6/2018 | Lee et al. | |
| 2018/0170140 A1* | 6/2018 | Lee | B60G 17/0165 |
| 2021/0155283 A1* | 5/2021 | Sakagami | B60G 21/051 |

FOREIGN PATENT DOCUMENTS

| | | | | |
|---|---|---|---|---|
| EP | 1757469 A1 * | 2/2007 | ........... | B60G 17/005 |
| KR | 20180069555 A | 6/2018 | | |

\* cited by examiner

VEHICLE SUSPENSION DEVICE

CROSS-REFERENCE TO RELATED APPLICATIONS

This application claims priority to Korean Patent Application No. 10-2019-0159912, filed on Dec. 4, 2019, which application is hereby incorporated herein by reference.

TECHNICAL FIELD

The present invention relates generally to a vehicle suspension device.

BACKGROUND

Recently, the development of a variety of suspensions has been undertaken in order to improve the driving comfort of a vehicle and reduce in-vehicle noise.

A suspension is one of major components of a vehicle, serving to connect a vehicle shaft to a frame or a chassis and to absorb vibration or shock transmitted from the road during traveling, thereby improving the driving comfort and stability of the vehicle. The suspension may include a plurality of components, such as a lower arm, an upper arm, a knuckle, a step link, a spring, a shock absorber, and a ball joint.

Such a suspension has a support structure comprised of a spring, a shock absorber, and the like to mechanically harmonize relative movements between a vehicle body and wheels in an appropriate manner. In addition, the suspension allows tires to be reliably in contact with the road surface, so that the vehicle body comes closer to the road during high-speed driving of the vehicle.

Recently, futuristic vehicles have been developed such that the weight of a vehicle is reduced and respective wheels can be controlled independently of each other. In such a futuristic vehicle, it may be inefficient to use a conventional suspension in terms of weight, fabrication cost, or the like. In addition, it may be difficult to control the wheels independently of each other. Therefore, the development of a suspension suitable to futuristic vehicles that have been miniaturized is demanded.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind problems occurring in the related art. Embodiments of the present invention provide a vehicle suspension device having a structure by which respective wheel and tire units can be driven independently of each other and the positions of respective wheel and tire units can be changed individually, so that a vehicle can be controlled to be in a variety of positions and the driving performance of the vehicle can be improved.

The present invention relates generally to a vehicle suspension device. Particular embodiments relate to a vehicle suspension device for providing a variety of positions to a vehicle by changing the positions of wheel and tire units.

In order to achieve the above objective, according to one embodiment of the present invention, there is provided a vehicle suspension device including a wheel body on which a wheel and tire unit is mounted, a steering drive unit transmitting driving force to rotate the wheel body in a lateral direction of a vehicle body, so that the wheel and tire unit rotates together with the wheel body, and a wheel moving unit disposed on the vehicle body to be movable in a front-back direction, configured such that a position thereof changes in a top-bottom direction, and connected to the wheel body to support the wheel body, so that a position of the wheel body is changed in response to the wheel moving unit moving in the front-back direction and changing the position in the top-bottom direction.

The wheel body may include a housing on which the steering drive unit and the wheel moving unit are disposed, and a wheel mount rotatably disposed on the housing, a tire wheel of the wheel and tire unit being mounted on the wheel mount.

The vehicle suspension device may further include a shock absorber connected to the wheel body and the wheel moving unit to absorb shock in response to the wheel body moving in the top-bottom direction.

The wheel body may include supports extending therefrom in the top-bottom direction. The shock absorber may include brackets rotatably mounted on the upper and lower supports of the wheel body, respectively, and elastic members disposed between the upper bracket of the brackets and the wheel body and between the lower bracket of the brackets and the wheel body, respectively, to absorb shock transmitted via the wheel body.

The steering drive unit may be disposed on the brackets of the shock absorber, and may be connected to the supports to rotate the supports when transmitting driving force, so that the wheel body rotates.

The steering drive unit may include a motor to generate rotating force, may be disposed on the upper bracket, and may be connected to the upper support of the wheel body by gear engagement.

The vehicle body may be provided with a plurality of guides spaced apart from each other in the top-bottom direction and extending in a front-back direction. The wheel moving unit may include a plurality of link connectors disposed above and below the wheel body. One end of each of the link connectors may be rotatably connected to a corresponding guide among the plurality of guides, and the other end of each of the link connectors may be rotatably connected to the corresponding bracket of the shock absorber.

The plurality of guides may be located in front and rear positions above and below the vehicle body. The link connectors may include a plurality of link connectors. Some of the plurality of link connectors may be connected to upper guides among the plurality of guides, located in the front and rear positions above the vehicle body, and the upper bracket, and the other of the plurality of link connectors may be connected to lower guides among the plurality of guides, located in the front and rear positions below the vehicle body, and the lower bracket.

Each of the link connectors may include a cylinder rotatably connected to a corresponding bracket among the brackets and a piston able to be retracted into and to extend from the cylinder and rotatably connected to a corresponding guide among the plurality of guides.

Each of the guides may include a rail extending from the vehicle body in a front-back direction, a link moving portion connected to the rail to move along the rail in response to a rotation of the rail, and to which the link connectors are rotatably connected, and a link drive unit disposed on the vehicle body and connected to the rail to rotate the rail.

The guides may be disposed in front and rear positions above and below the vehicle body, such that the rails are provided in front and rear positions, respectively. The front rails may be rotatably connected to the rear rails via bearings disposed on the vehicle body, respectively.

The wheel body, the steering drive unit, and the wheel moving unit may be provided on each of front and rear wheels of the vehicle body. The steering drive unit and the wheel moving unit may be respectively controlled.

According to the vehicle suspension device having the above-described structure, the respective wheel and tire units can be driven independently of each other and the positions of respective wheel and tire units can be changed individually, so that a vehicle can be controlled to be in a variety of positions and the driving performance of the vehicle can be improved. In addition, since the wheel and tire units are disposed on the vehicle body using the link connection structure, structural strength can be obtained.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF ILLUSTRATIVE EMBODIMENTS

Hereinafter, a vehicle suspension device according to exemplary embodiments of the present invention will be described with reference to the accompanying drawings.

Figure 1:
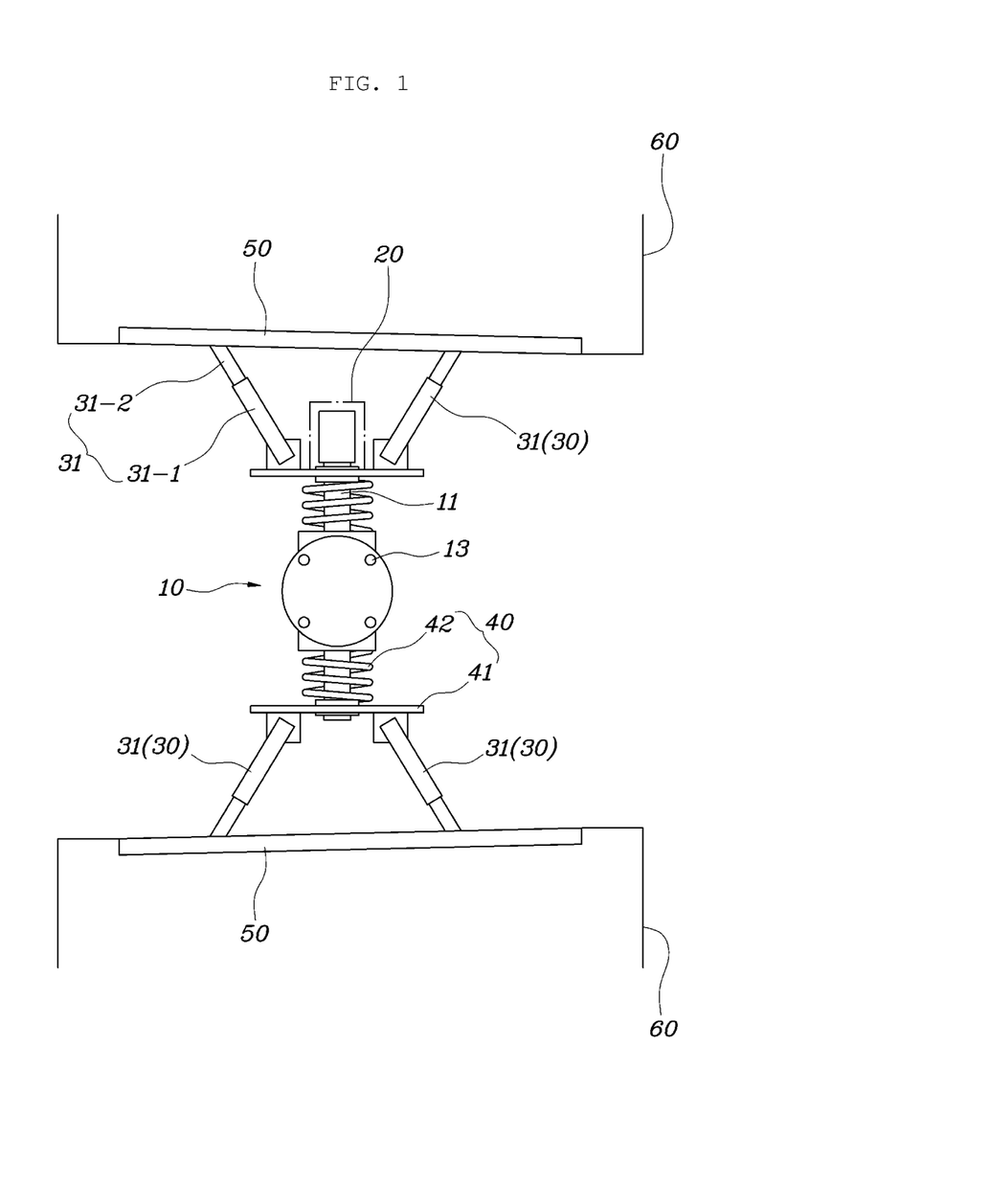
FIG. 1 is a view illustrating a vehicle suspension device according to an exemplary embodiment of the present invention.
Figure 4:
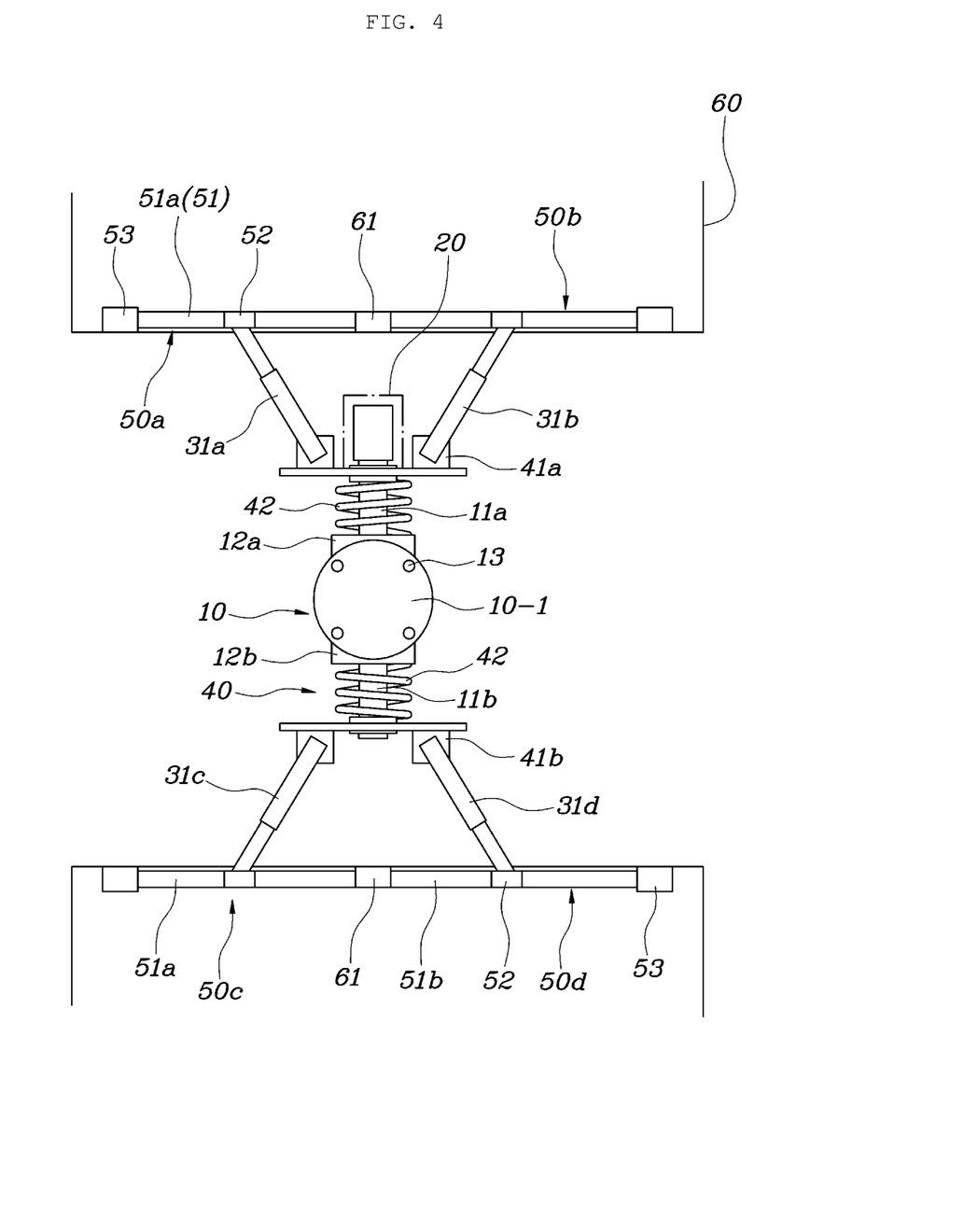
Figure 5:
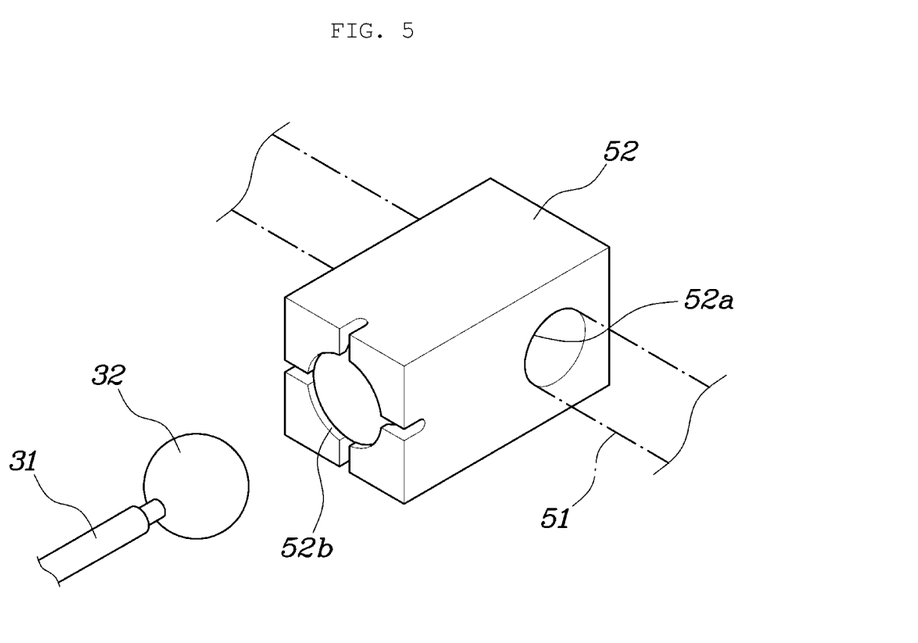
Figure 6:
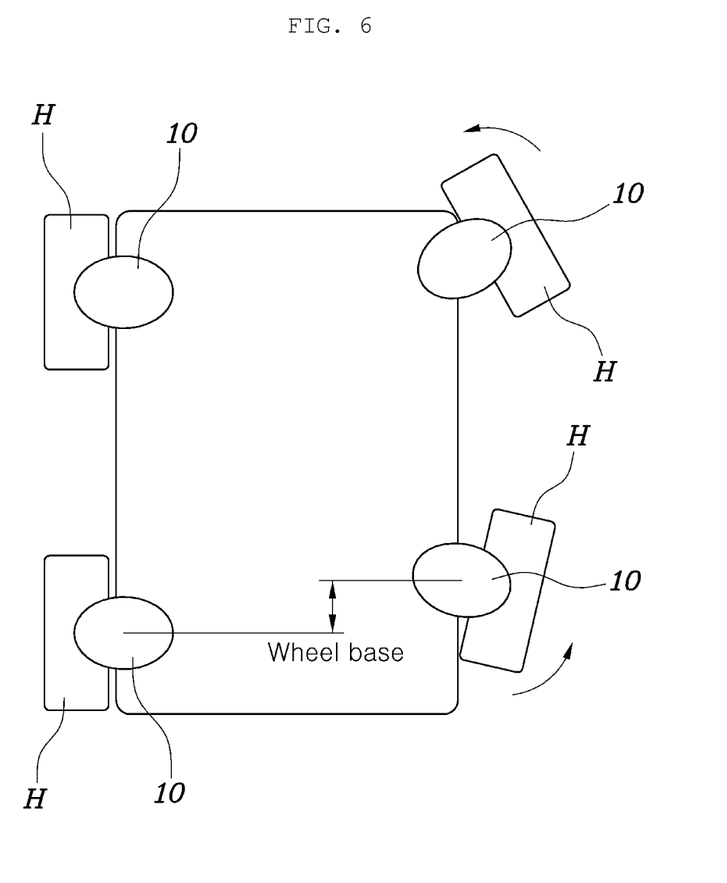
FIG. 6 is a view illustrating an embodiment in which the positions of the front wheels and the rear wheels are adjusted by the vehicle suspension device according to embodiments of the present invention.
Figure 7:
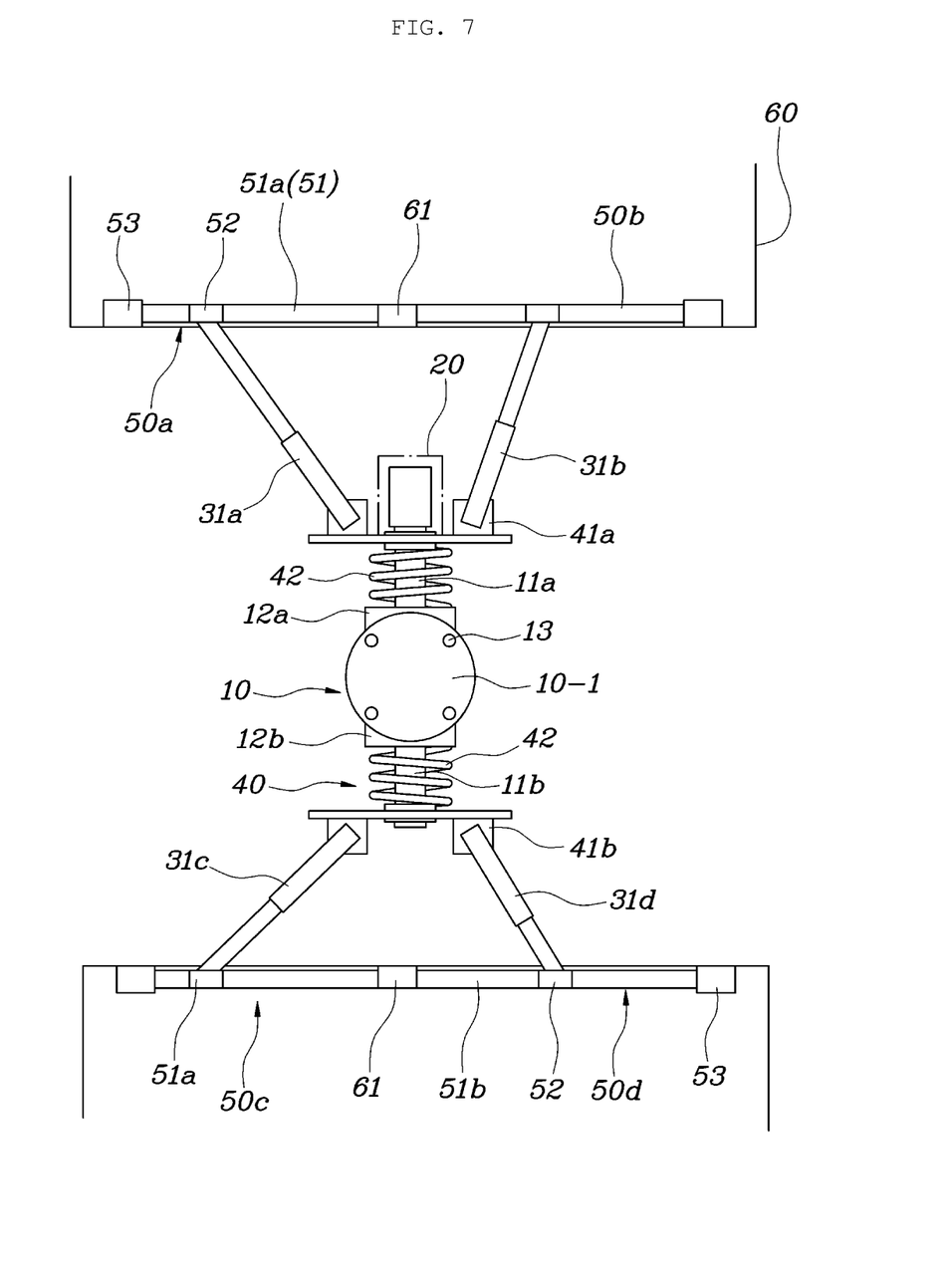
FIGS. 7 and 8 are views illustrating an embodiment in which the position of the wheel body of the vehicle suspension device according to embodiments of the present invention is adjusted.
Figure 8:
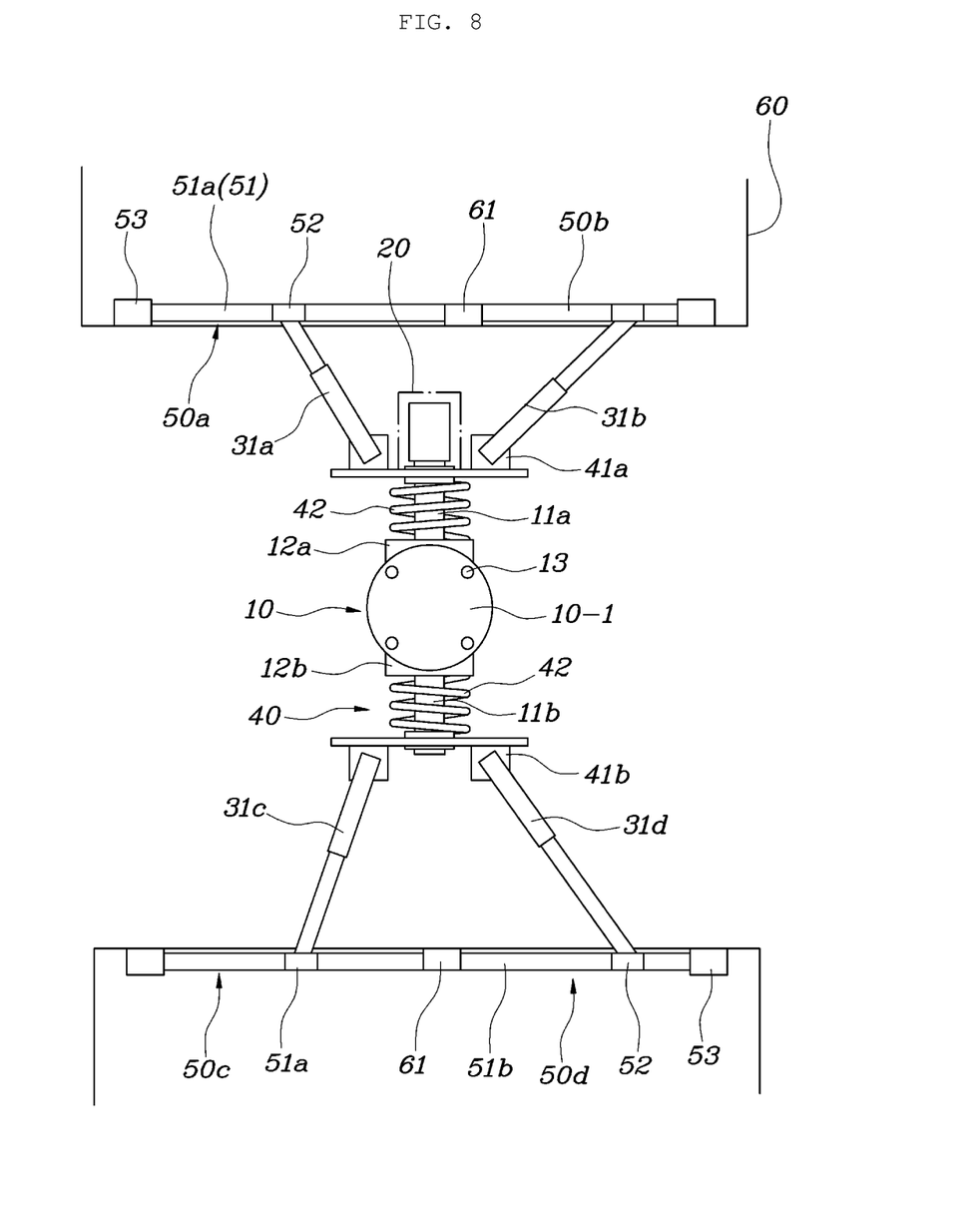

FIG. 1 illustrates a vehicle suspension device according to an exemplary embodiment of the present invention, FIGS. 2 to 5 illustrate the suspension device illustrated in FIG. 1, FIG. 6 illustrates an embodiment in which the positions of front wheels and rear wheels are adjusted by the vehicle suspension device according to embodiments of the present invention, and FIGS. 7 and 8 illustrate an embodiment in which the position of a wheel body of the vehicle suspension device according to embodiments of the present invention is adjusted.

Figure 2:
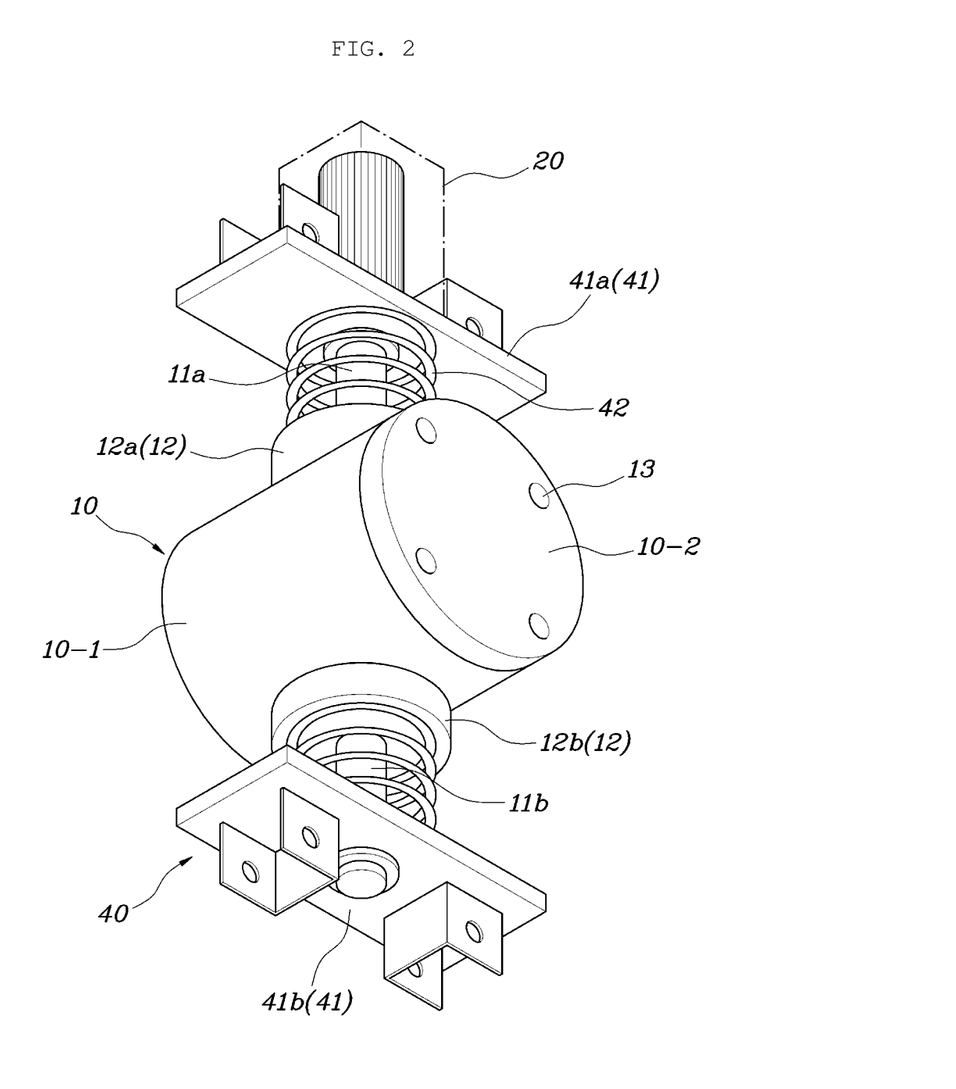
FIGS. 2 to 5 are views illustrating the vehicle suspension device illustrated in FIG. 1.

As illustrated in FIGS. 1 and 2, the vehicle suspension device according to embodiments of the present invention includes a wheel body 10, a steering drive unit 20, and a wheel moving unit 30. A wheel and tire unit (H in FIG. 6) is mounted on the wheel body 10. The steering drive unit 20 transmits driving force to rotate the wheel body 10 in a lateral direction of a vehicle body 60, so that the wheel and tire unit H rotates together with the wheel body 10. The wheel moving unit 30 is disposed on the vehicle body 60 to be movable in a front-back direction, and is configured such that the position thereof changes in a top-bottom direction. The wheel moving unit 30 is connected to the vehicle body 60 to support the wheel body 10. In response to the wheel moving unit 30 moving in the front-back direction and changing the position in the top-bottom direction, the position of the wheel body 10 is changed.

As described above, the vehicle suspension device according to embodiments of the present invention includes the wheel body 10, the steering drive unit 20, and the wheel moving unit 30 disposed on the vehicle body 60. The wheel and tire unit H is mounted on the wheel body 10, and bolt fastening holes 13 allowing the wheel and tire unit H to be mounted are formed in the wheel body 10. Positions where the bolt fastening holes 13 are formed may be determined depending on the size of the wheel and tire unit H. In this manner, the wheel and tire unit H is rotatably mounted on the wheel body 10, and the wheel body 10 is disposed on the vehicle body 60 via the wheel moving unit 30.

Here, the wheel moving unit 30 is disposed to be movable back and forth on the vehicle body 60, and is configured such that the position thereof changes in the top-bottom direction. Accordingly, when the wheel moving unit 30 moves back and forth on the vehicle body 60, the position of the wheel body 10 is changed in a front-back direction, and thus, the wheel base is adjustable. When the position of the wheel moving unit 30 is changed in the top-bottom direction, the vehicle body 60 may move upwards or downwards, and thus, the position of the vehicle may be adjusted. In this manner, the position of the wheel body 10 is adjusted in the front-back direction and the top-bottom direction by the wheel moving unit 30. Accordingly, the position control of the vehicle can be performed in an optimized manner according to a variety of driving conditions of the vehicle, thereby improving the driving performance of the vehicle.

In addition, the steering drive unit 20 is disposed on the wheel body 10, such that the wheel body 10 rotates in the lateral direction of the vehicle body 60. Specifically, when the steering drive unit 20 is operated, the steering drive unit 20 transmits driving force to the wheel body 10 so that the wheel body 10 rotates in the lateral direction of the vehicle body 60. Accordingly, the wheel and tire unit H is rotated together with the wheel body 10, so that the vehicle turns.

As described above, according to embodiments of the present invention, the control and position change of the wheel and tire unit H can be performed independently of the corresponding driving wheel of the vehicle body 60, thereby obtaining the optimized driving performance according to a variety of driving conditions of the vehicle.

Figure 3:
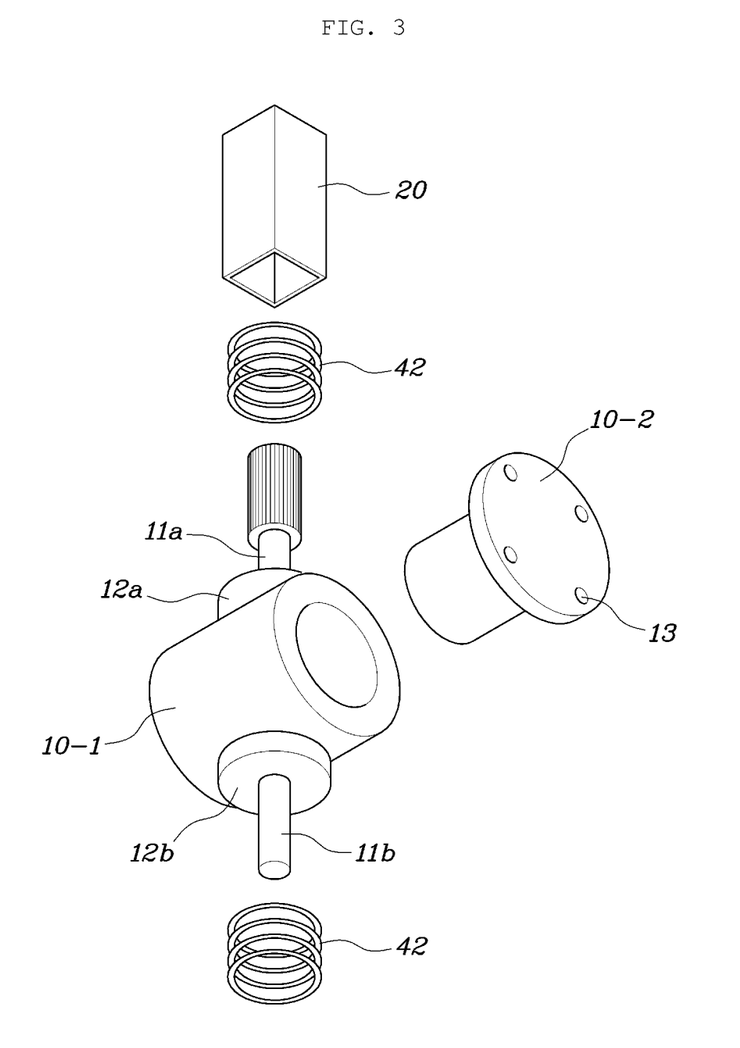

Describing the present invention in more detail, as illustrated in FIGS. 2 and 3, the wheel body 10 may include a housing 10-1 and a wheel mount 10-2. The steering drive unit 20 and the wheel moving unit 30 are disposed on the housing 10-1. The wheel mount 10-2 is rotatably disposed on the housing 10-1, and the wheel and tire unit H is mounted on the wheel mount 10-2.

In this manner, the wheel body 10 includes the housing 10-1 and the wheel mount 10-2. Specifically, the wheel and tire unit H may be mounted on the wheel mount 10-2 by bolt fastening, and the wheel mount 10-2 is rotatably disposed on the housing 10-1. Accordingly, the vehicle can travel due to the rotation of the wheel and tire unit H. In the housing 10-1, the steering drive unit 20 and the wheel moving unit 30 are disposed. The housing 10-1 is rotated in the lateral direction by the steering drive unit 20, thereby allowing the vehicle to turn. The position of the vehicle is adjusted by the wheel moving unit 30. Here, a brake unit for braking the wheel and tire unit H or a drive unit for rotating the wheel and tire unit H may further be disposed in the housing 10-1. However, descriptions thereof will be omitted herein, since the embodiments of the present invention relate to the vehicle suspension device.

As described above, the wheel body 10 can control the vehicle to be in a variety of positions, since the wheel mount 10-2 mounted with the wheel and tire unit H is disposed on the housing 10-1 to rotate as a driving wheel and the position of the housing 10-1 is adjusted.

In addition, a shock absorber 40 connected to the wheel body 10 and the wheel moving unit 30 to absorb shock in response to the movement of the wheel body 10 in the top-bottom direction. In this manner, the shock absorber 40 reduces the amount of shock transmitted to the vehicle body 60 during traveling of the vehicle. Since the shock absorber 40 is connected to the wheel body 10 and the wheel moving unit 30, the wheel body 10 is disposed on the wheel moving unit 30 via the shock absorber 40.

Specifically, as illustrated in FIGS. 2 and 3, the wheel body 10 has supports 11 extending therefrom in the top-bottom direction. The shock absorber 40 may include brackets 41 rotatably mounted on the upper and lower supports 11 of the wheel body 10, respectively, and elastic members 42 disposed between the upper and lower brackets 41 and the wheel body 10, respectively, to absorb shock transmitted via the wheel body 10.

Specifically, as the supports 11 aligned on a vertical line in the top-bottom direction extend upward and downward from the wheel body 10, the wheel body 10 may be connected to the shock absorber 40 via the supports 11, and may rotate about the supports 11, so that the wheel and tire unit H may rotate in a direction in which the vehicle turns. Accordingly, the supports 11 may include an upper support 11a and a lower support 11b.

The shock absorber 40 includes the brackets 41 on which the upper and lower supports 11 of the wheel body 10 are rotatably mounted, respectively. The brackets 41 are connected to the vehicle body 60 via the wheel moving unit 30. The elastic members 42 are provided between the brackets 41 and the wheel body 10 such that the supports 11 extend through the elastic members 42. According to this configuration, the shock transmitted via the wheel body 10 is absorbed by the elastic members 42. Here, the elastic members 42 may be implemented as springs.

In addition, seating portions 12, on which the elastic members 42 are seated, may be provided on the top portion and the bottom portion of the wheel body 10. According to this configuration, the upper support 11a of the wheel body 10 is rotatably connected to the upper bracket 41a, and the lower support 11b is rotatably connected to the lower bracket 41b, such that the wheel body 10 may rotate in the lateral direction to change the angle of the wheel and tire unit H. In addition, the elastic members 42 are provided between the upper seating portion 12a and the upper bracket 41a and between the lower seating portion 12b and the lower bracket 41b, respectively. Accordingly, the elastic members 42 absorb shock produced from the road surface, thereby reducing the amount of shock transmitted to the vehicle body 60.

The wheel body 10, the steering drive unit 20, and the wheel moving unit 30 are connected via the shock absorber 40 so as to work in concert with each other. This will be described in more detail later.

The steering drive unit 20 for the turning of the vehicle is disposed on the brackets 41 of the shock absorber 40. The steering drive unit 20 is connected to the supports 11 to rotate the supports 11 when transmitting driving force, so that the wheel body 10 rotates.

As illustrated in FIGS. 2 and 3, the steering drive unit 20 is disposed on the brackets 41 of the shock absorber 40 and is connected to the supports 11. In the case of transmitting driving force in response to the operation of the steering drive unit 20, the steering drive unit 20 causes the wheel body 10 to rotate so that the vehicle turns.

Here, the steering drive unit 20 is implemented as a motor to generate torque (or rotating force). The steering drive unit 20 is connected to the supports 11 of the wheel body 10 by gear engagement. Accordingly, in the case of transmitting the torque of the motor, the supports 11 to the steering drive unit 20 by gear engagement are rotated. The steering drive unit 20 and the supports 11 may be implemented as a variety of torque transmission structures, such as a rack-and-pinion structure or a gear engagement structure using a reducer.

In particular, the steering drive unit 20 may be disposed on the upper bracket 41a, and may be connected to the upper support 11a of the wheel body 10 by gear engagement. In a case in which the steering drive unit 20 is disposed on the lower bracket 41b, the steering drive unit 20 may be subjected to contamination and damage due to external factors, since the steering drive unit 20 is located close to the road surface. In addition, since impurities may accumulate on portions in which the steering drive unit 20 and the supports 11 are gear-engaged, accurate operation may not be performed. Accordingly, the steering drive unit 20 is disposed on the upper bracket 41a to be connected to the upper support 11a in order to minimize damage caused by external factors.

In addition, a structure for changing the position of the wheel and tire unit H will be described. As illustrated in FIG. 1, the vehicle body 60 is provided with a plurality of guides 50 spaced apart from each other in the top-bottom direction and extending in the front-back direction. The wheel moving unit 30 may be comprised of a plurality of link connectors 31 disposed above and below the wheel body 10. One end of each of the link connectors 31 is rotatably connected to the corresponding guide 50, and the other end of each of the link connectors 31 is rotatably connected to the corresponding bracket 41 of the shock absorber 40.

As described above, the wheel moving unit 30 includes the link connectors 31, each of which has one end rotatably connected to the corresponding guide 50 and the other end rotatably connected to the corresponding bracket 41 of the shock absorber 40. Accordingly, the wheel body 10 may be disposed on the vehicle body 60 via the link connectors 31 of the wheel moving unit 30. Specifically, the plurality of link connectors 31 are comprised of the upper link connectors 31 connected to the upper guides 50 and the upper bracket 41a and the lower link connectors 31 connected to the lower guides 50 and the lower bracket 41b. The length of each of the link connectors 31 is variable. As described above, the wheel body 10 may be disposed on the vehicle body 60 via the upper and lower link connectors 31 (31a and 31b). When the position of the wheel body 10 is changed, the length of each of the link connectors 31 may be changed to absorb a change in length. Accordingly, differences in length in response to the change in the position of the wheel body 10 can be absorbed, and thus, a smooth operational relationship may be obtained.

Here, each of the link connectors 31 may include a cylinder 31-1 rotatably connected to the bracket 41 and a piston 31-2 able to be retracted into and to extend from the cylinder 31-1 and rotatably connected to the corresponding guide 50.

Specifically, each of the link connectors 31 is configured such that the length of the link connector 31 increases when the piston 31-2 extends from the cylinder 31-1 and decreases when the piston 31-2 is retracted into the cylinder 31-1. In addition, since the cylinder 31-1 and the piston 31-2 are rotatably connected to the bracket 41 and the guide 50, the differences in length in response to the change in the position of the wheel body 10 are absorbed. The link connectors 31 may be respectively implemented as a hydraulic link connector, with fluid being contained within the cylinder 31-1, or a mechanical link connector, with a spring being disposed within the cylinder 31-1, so as to have a shock absorbing function and a function of supporting the vehicle body 60.

In addition, as illustrated in FIGS. 1 and 4, the guides 50 are provided as a plurality of guides 50 located in front and rear positions above and below the vehicle body 60. The link connectors 31 may be provided as a plurality of link connectors 31. Some of the plurality of link connectors 31 are connected to the upper guides 50, located in the front and rear positions above the vehicle body 60, and the upper bracket 41, while the other of the plurality of link connectors 31 are connected to the lower guides 50, located in the front and rear positions below the vehicle body 60, and the lower bracket 41.

As described above, the guides 50 may include an upper front guide 50a, an upper rear guide 50b, a lower front guide 50c, and a lower rear guide 50d. The link connectors 31 may include an upper front link connector 31a connected to the upper front guide 50a and the upper bracket 41a, an upper rear link connector 31b connected to the upper rear guide 50b and the upper bracket 41a, a lower front link connector 31c connected to the lower front guide 50c and the lower bracket 41b, and a lower rear link connector 31d connected to the lower rear guide 50d and the lower bracket 41b.

As described above, the link connectors 31 are provided in positions above and below the wheel body 10, and the wheel body 10 is connected to the guides 50 provided above and below the wheel body 10 via the upper and lower link connectors 31. According to this configuration, the wheel body 10 can be strongly disposed on the vehicle body 60. In addition, since the position of the wheel body 10 is changed in the front-back direction and in the top-bottom direction in response to changes in the position of the link connectors 31 connected to the guides 50, the position of the vehicle can be controlled in an optimized manner in a variety of driving conditions.

In addition, as illustrated in FIGS. 4 and 5, each of the guides 50 may include a rail 51 extending from the vehicle body 60 in a front-back direction, a link moving unit 52 connected to the rail 51 to move along the rail 51 in response to the rotation of the rail 51, and to which the link connectors 31 are rotatably connected, and a link drive unit 53 disposed on the vehicle body 60 and connected to the rail 51 to rotate the rail 51.

As described above, each of the guides 50 includes the rail 51, the link moving unit 52, and the link drive unit 53, the rail 51 is a screw extending in the front-rear direction of the vehicle body 60, and the link moving unit 52 may be screw-engaged with the rail 51 to move along the rail 51 when the rail 51 is rotated. Here, the rail 51 is rotated by the link drive unit 53 disposed on the vehicle body 60. In addition, the link moving unit 52 may have a through-hole 52a through which the rail 51 extends and a ball bearing connector 52b to which the corresponding link connector 31 is connected. In addition, a ball 32 is provided on the link connector 31 to be inserted into the ball bearing connector 52b, such that the link connector 31 may be rotatably connected to the link moving unit 52.

The rail 51, the link moving unit 52, and the link drive unit 53 as described above are provided in each position among front and rear positions above and below the vehicle body 60, such that the angles and lengths of the upper and lower link connectors 31 connected to the wheel body 10 may be varied depending on the positions of the link moving units 52 provided in front and rear positions above and below the vehicle body 60, thereby changing the position of the wheel body 10.

Here, since the guides 50 are disposed in front and rear positions above and below the vehicle body 60, the rails 51 are provided in front and rear positions, respectively. The front rails 51a may be rotatably connected to the rear rails 51b via bearings 61 disposed on the vehicle body 60, respectively.

As illustrated in FIG. 4, since the rails 51 are disposed in the front and rear positions, the front-rear position of the link connector 31 connected to the front rail 51a via the link moving unit 52 and the front-rear position of the link connector 31 connected to the rear rail 51b via the link moving unit 52 may be changed.

Specifically, when the link moving unit 52 provided in the front rail 51a and the link moving unit 52 provided in the rear rail 51b are driven to move away from each other by the link drive units 53, the angle between the link connectors 31 connected to the link moving units 52 is increased. In contrast, when the link moving unit 52 provided in the front rail 51a and the link moving unit 52 provided in the rear rail 51b are driven to move toward each other by the link drive units 53, the angle between the link connectors 31 connected to the link moving units 52 is reduced. In this manner, the angles of the upper and lower link connectors 31 are changed depending on the positions of the movement of the link moving units 52 disposed in the upper front and rear positions and the lower front and rear positions, so that the position of the wheel body 10 is changed, thereby changing the position of the vehicle.

In addition, the front rail 51a and the rear rail 51b are connected to and supported by the bearing 61 disposed on the vehicle body 60, so that the strength thereof may be increased. Since the front rail 51a and the rear rail 51b are rotatably connected via the bearing 61, the size of the entire package may be reduced.

In addition, the wheel body 10, the steering drive unit 20, and the wheel moving unit 30 may be provided on each of the front and rear wheels of the vehicle body 60. The steering drive unit 20 and the wheel moving unit 30 may be respectively controlled. Accordingly, as illustrated in FIG. 6, the positions of the wheel and tire units H provided on the front and rear wheels of the vehicle body 60 may be adjusted independently of each other, so that a variety of driving characteristics may be provided depending on a variety of driving conditions.

In the vehicle suspension device according to embodiments of the present invention as described above, the positions of the wheel and tire units H respectively including the wheel body 10 may be changed as follows.

Specifically, as illustrated in FIG. 1, in an initial stage, none of the link drive units 53 of the vehicle body 60 is operated, and the positions of the upper front link connector 31a, the upper rear link connector 31b, the lower front link connector 31c, and the lower rear link connector 31d are maintained, so that the wheel body 10 remains in the initial position.

In addition, as illustrated in FIGS. 7 and 8, when the position of the vehicle is controlled upwardly or downwardly, the upper front link connector 31a connected to the upper front guide 50a, the upper rear link connector 31b connected to the upper rear guide 50b, the lower front link connector 31c connected to the lower front guide 50c, and the lower rear link connector 31d connected to the lower rear guide 50d are adjusted, so that the angles and lengths of the link connectors 31 are changed in concert with the positions of the link moving units 52, thereby changing the position of the wheel body 10.

Accordingly, as illustrated in FIG. 7, the wheel body 10 may be moved downward and rearward. As illustrated in FIG. 8, the wheel body 10 may be moved upward and forward. The position of the wheel body 10 can be changed by the changes in the angle and length of the link connectors 31 in response to the adjustment of the positions of the link moving units 52, thereby optimizing the position of the wheel body 10 to be suitable to the driving conditions of the vehicle.

In the vehicle suspension device having the above-described structure, the wheel and tire units H can be driven independently of each other and the positions of the wheel and tire units H can be changed individually, so that the positions of the wheel and tire units H can be controlled in an optimized manner depending on a variety of driving conditions of the vehicle. In addition, since the wheel and tire units H are disposed on the vehicle body using the link connection structure, structural strength can be obtained.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A vehicle suspension device comprising:
a wheel body on which a wheel and tire unit is to be mounted;
a steering drive unit configured to transmit a driving force to rotate the wheel body in a lateral direction of a vehicle body, so that the wheel and tire unit will rotate together with the wheel body; and
a wheel moving unit disposed on the vehicle body, the wheel moving unit being movable in a front-back direction with respect to the vehicle body and being configured such that a position of the wheel moving unit changes in a top-bottom direction, the wheel moving unit being connected to the wheel body to support the wheel body, so that a position of the wheel body is changed in response to the wheel moving unit moving in the front-back direction and to the wheel moving unit changing position in the top-bottom direction;
wherein the wheel body includes a housing on which the steering drive unit and the wheel moving unit are disposed and a wheel mount rotatably disposed on the housing, a tire wheel of the wheel and tire unit mountable on the wheel mount.

2. The vehicle suspension device according to claim 1, further comprising a shock absorber connected to the wheel body and the wheel moving unit, wherein the shock absorber is configured to absorb shock in response to the wheel body moving in the top-bottom direction.

3. The vehicle suspension device according to claim 2, wherein:
the wheel body includes supports extending therefrom in the top-bottom direction; and
the shock absorber includes brackets rotatably mounted on upper and lower supports of the wheel body, respectively, and elastic members disposed between an upper bracket of the brackets and the wheel body and between a lower bracket of the brackets and the wheel body, respectively, wherein the elastic members are configured to absorb shock transmitted via the wheel body.

4. The vehicle suspension device according to claim 3, wherein the steering drive unit is disposed on one of the brackets of the shock absorber, and is connected to the upper and lower supports to rotate the upper and lower supports when transmitting the driving force, so that the wheel body rotates.

5. The vehicle suspension device according to claim 4, wherein the steering drive unit comprises a motor to generate a rotating force, is disposed on the upper bracket, and is connected to an upper support of the wheel body by gear engagement.

6. The vehicle suspension device according to claim 3, wherein:
the vehicle body is provided with a plurality of guides spaced apart from each other in the top-bottom direction and extending in the front-back direction; and
the wheel moving unit includes two pluralities of link connectors, a first plurality of link connectors disposed above the wheel body and a second plurality of link connectors disposed below the wheel body, wherein a first end of each of the link connectors is rotatably connected to a corresponding guide among the plurality of guides, and a second end of each of the link connectors is rotatably connected to a corresponding bracket of the shock absorber.

7. The vehicle suspension device according to claim 6, wherein:
the guides are located in front and rear positions above and below the vehicle body; and
the link connectors comprise a plurality of link connectors, wherein some of the plurality of link connectors are connected to upper guides among the plurality of guides located in the front and rear positions above the vehicle body and to the upper bracket, and others of the plurality of link connectors are connected to lower guides among the plurality of guides located in the front and rear positions below the vehicle body and to the lower bracket.

8. The vehicle suspension device according to claim 6, wherein each of the link connectors includes a cylinder rotatably connected to a corresponding bracket among the brackets and a piston configured to be retracted into and to extend from the cylinder and is rotatably connected to a corresponding guide among the plurality of guides.

9. The vehicle suspension device according to claim 6, wherein each of the guides includes a rail extending from the vehicle body in the front-back direction, a link moving portion connected to the rail to move along the rail in response to a rotation of the rail and to which the link connectors are rotatably connected, and a link drive unit disposed on the vehicle body and connected to the rail to rotate the rail.

10. The vehicle suspension device according to claim 9, wherein:
the guides are disposed in front and rear positions above and below the vehicle body, such that the rails are provided in front and rear positions, respectively; and
the rails in the front position are rotatably connected to the rails in the rear position via bearings disposed on the vehicle body, respectively.

11. The vehicle suspension device according to claim 1, wherein the wheel body, the steering drive unit, and the wheel moving unit are provided on each of front and rear wheels of the vehicle body, and the steering drive unit and the wheel moving unit are configured to be respectively controlled.

12. A vehicle suspension device comprising:
   a vehicle body;
   a wheel body comprising a housing;
   a wheel and tire unit mounted on the wheel body;
   a steering drive unit disposed on the housing of the wheel body;
   a wheel moving unit disposed on the vehicle body and configured to be movable in a front-back direction; and
   a shock absorber connected to the wheel body and the wheel moving unit.

13. The vehicle suspension device according to claim 12, wherein the wheel moving unit is configured to support the wheel body.

14. The vehicle suspension device according to claim 12, wherein the wheel and tire unit includes bolt fastening holes, and wherein the wheel and tire unit is mounted on the wheel body by bolt fastening.

15. The vehicle suspension device according to claim 12, wherein the wheel body further comprises a wheel mount rotatably disposed on the housing of the wheel body.

16. The vehicle suspension device according to claim 15, wherein:
   the wheel moving unit is disposed on the housing of the wheel body; and
   the wheel and tire unit is mounted on the wheel mount.

17. The vehicle suspension device according to claim 12, further comprising:
   an upper support extending upward from the wheel body;
   a lower support extending downward from the wheel body;
   an upper bracket mounted on the upper support;
   a lower bracket mounted on the lower support;
   a first elastic member disposed between the upper bracket and the wheel body; and
   a second elastic member disposed between the lower bracket and the wheel body.

18. The vehicle suspension device according to claim 12, wherein:
   the vehicle body comprises a plurality of guides spaced apart from each other in a top-bottom direction and extending in a front-back direction;
   the wheel moving unit comprises a plurality of link connectors disposed above and below the wheel body;
   a first end of each of the link connectors is rotatably connected to a corresponding one of the guides; and
   a second end of each of the link connectors is rotatably connected to a corresponding one of a plurality of brackets of the shock absorber.

19. The vehicle suspension device according to claim 18, wherein each of the link connectors includes a cylinder rotatably connected to the corresponding one of the brackets and a piston rotatably connected to the corresponding one of the guides, wherein the piston is configured to retract into and extend from the cylinder.

20. A vehicle suspension device comprising:
   a wheel body on which a wheel and tire unit is to be mounted;
   a steering drive unit configured to transmit a driving force to rotate the wheel body in a lateral direction of a vehicle body, so that the wheel and tire unit will rotate together with the wheel body;
   a wheel moving unit disposed on the vehicle body, the wheel moving unit being movable in a front-back direction with respect to the vehicle body and being configured such that a position of the wheel moving unit changes in a top-bottom direction, the wheel moving unit connected to the wheel body to support the wheel body, so that a position of the wheel body is changed in response to the wheel moving unit moving in the front-back direction and to the wheel moving unit changing position in the top-bottom direction;
   a shock absorber connected to the wheel body and the wheel moving unit, wherein the shock absorber is configured to absorb shock in response to the wheel body moving in the top-bottom direction;
   wherein the wheel body includes supports extending therefrom in the top-bottom direction;
   wherein the shock absorber includes brackets rotatably mounted on upper and lower supports of the wheel body, respectively, and elastic members disposed between an upper bracket of the brackets and the wheel body and between a lower bracket of the brackets and the wheel body, respectively, wherein the elastic members are configured to absorb shock transmitted via the wheel body;
   wherein the vehicle body is provided with a plurality of guides spaced apart from each other in the top-bottom direction and extending in the front-back direction; and
   wherein the wheel moving unit includes a plurality of link connectors, at least one link connector disposed above the wheel body and at least one link connector disposed below the wheel body, wherein a first end of each of the link connectors is rotatably connected to a corresponding guide among the plurality of guides, and a second end of each of the link connectors is rotatably connected to a corresponding bracket of the shock absorber; and
   wherein each of the guides includes a rail extending from the vehicle body in the front-back direction, a link moving portion connected to the rail to move along the rail in response to a rotation of the rail and to which the link connectors are rotatably connected, and a link drive unit disposed on the vehicle body and connected to the rail to rotate the rail.

* * * * *